United States Patent
Farley et al.

(10) Patent No.: US 11,512,800 B2
(45) Date of Patent: Nov. 29, 2022

(54) METHOD OF FORMING ASSEMBLY BETWEEN PANEL AND TUBE

(71) Applicant: Rheem Manufacturing Company, Atlanta, GA (US)

(72) Inventors: Darryl J. Farley, Fort Smith, AR (US); Darrell E. Binz, Fort Smith, AR (US); Ken Guinn, Fort Smith, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 128 days.

(21) Appl. No.: 17/000,628

(22) Filed: Aug. 24, 2020

(65) Prior Publication Data
US 2022/0057026 A1 Feb. 24, 2022

(51) Int. Cl.
| | |
|---|---|
| *B23P 15/26* | (2006.01) |
| *F16L 19/04* | (2006.01) |
| *F16L 19/028* | (2006.01) |
| *B23P 19/02* | (2006.01) |
| *F16L 37/26* | (2006.01) |

(52) U.S. Cl.
CPC .............. *F16L 19/04* (2013.01); *B23P 19/02* (2013.01); *F16L 19/0286* (2013.01); *F16L 37/26* (2013.01); *Y10T 29/49945* (2015.01)

(58) Field of Classification Search
CPC ....... B21D 53/085; B21D 53/08; B23P 11/00; B23P 15/26; B23P 19/02; F28F 9/182; F16L 19/04; F16L 19/0286; F16L 37/26; Y10T 29/49945
See application file for complete search history.

(56) References Cited

U.S. PATENT DOCUMENTS

| | | | |
|---|---|---|---|
| 4,528,733 A | 7/1985 | Lord | |
| 4,616,390 A * | 10/1986 | MacCracken | F28D 20/021 |
| | | | 165/172 |
| 4,744,505 A * | 5/1988 | Calleson | B21D 39/06 |
| | | | 228/183 |
| 5,150,520 A | 9/1992 | DeRisi | |
| 5,457,885 A * | 10/1995 | Ohashi | F28F 9/001 |
| | | | 29/890.044 |

(Continued)

FOREIGN PATENT DOCUMENTS

| | | |
|---|---|---|
| EP | 143062 B1 | 11/1987 |
| EP | 727393 A2 | 8/1996 |

OTHER PUBLICATIONS

English translation of JP-H09296993 (Year: 1997).*

*Primary Examiner* — Jun S Yoo
(74) *Attorney, Agent, or Firm* — Eversheds Sutherland (US) LLP

(57) ABSTRACT

A method of forming an assembly between a panel and a tube includes forming a hole in the panel, where a diameter of the hole is smaller than an outer diameter of the tube, and preforming a first end of the tube to conceal the hole of the panel. A diameter of the preformed portion is greater than the diameter of the hole and the outer diameter of the tube. The method further includes aligning a second end of the tube with the hole of the panel, followed by inserting the tube into the hole by application of axial force on the tube until the preformed first end of the tube abuts a periphery of the hole of the panel. The method also includes achieving an interference fit between the hole of the panel and the tube.

6 Claims, 7 Drawing Sheets

(56) References Cited

U.S. PATENT DOCUMENTS

| | | | | |
|---|---|---|---|---|
| 5,562,153 A | * | 10/1996 | Sasaki | F28F 9/18 |
| | | | | 29/726.5 |
| 2019/0003739 A1 | * | 1/2019 | Aoki | F24H 8/00 |

* cited by examiner

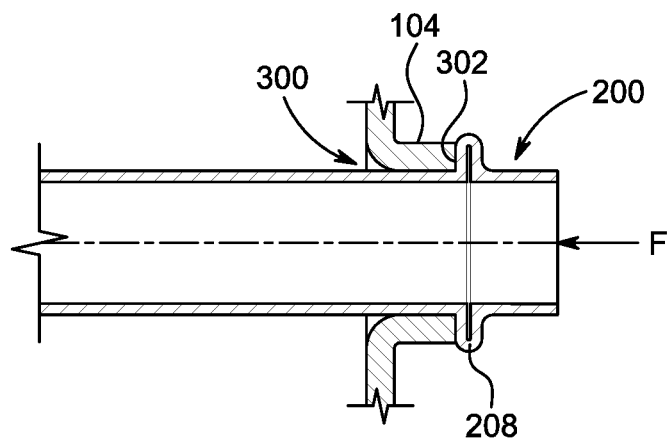
FIG. 3C
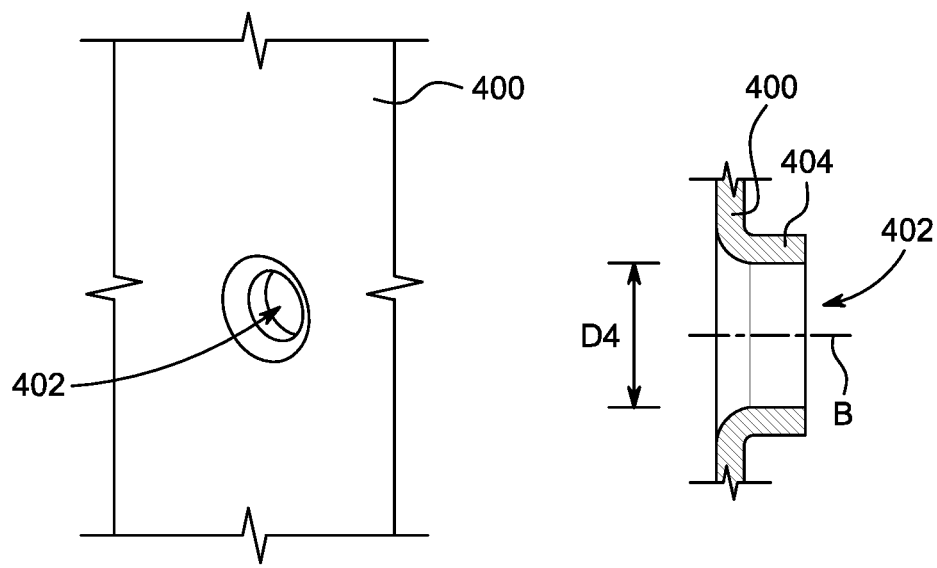
FIG. 4A
FIG. 4B

METHOD OF FORMING ASSEMBLY BETWEEN PANEL AND TUBE

TECHNICAL FIELD

The present disclosure relates, in general, to a method of forming an assembly between a panel and a tube and, more specifically relates, to a method of forming the assembly between the panel and tube by interference fit.

BACKGROUND

Conventionally, in order to achieve a joint between a tube and a panel, the tube is inserted into a hole extruded in the panel followed by forced insertion of a mandrel into the tube. The mandrel expands a portion of the tube at the hole in the panel, resulting in an interference fit between the tube and the panel. Further, at an end of the tube that extends from the panel extrusion, a die is used at the end of the tube to form a rolled end that compresses and covers a lip of the panel extrusion. The rolled end of the tube around the lip of the panel extrusion secures the tube to the panel. However, in cases where tube diameter is less than that of the mandrel, insertion of the mandrel remains a challenge. In cases of high-volume production of joints between multiple panels and tubes, handling the mandrel would require a different setup which adds to the costs and renders the process complex.

SUMMARY

According to the present disclosure, a method of forming an assembly between a panel and a tube is disclosed. The method can include forming a hole in the panel, such that a diameter of the hole is smaller than an outer diameter of the tube. The method can include punching the hole in the panel by a punching tool and forming a shoulder extending from a periphery of the hole of the panel. The outer diameter of the tube can be 0.25 inch, and the diameter of the hole defined in the panel can 0.244 inch, as a non-limiting example. The method further can include preforming a first end of the tube to conceal the hole of the panel. As an example, the tube can be made of stainless steel and a diameter of the preformed portion can be greater than the diameter of the hole and the outer diameter of the tube. The method can include preforming the first end of the tube to generate a flare or a flange and sealing a lip of the shoulder formed in the panel with the flare or the flange. The method can include aligning a second end of the tube, that is opposite to the first end thereof, with the hole of the panel. The method can include inserting the tube into the hole by application of axial force on the tube until the preformed first end of the tube abuts a periphery of the hole of the panel. The axial force applied on the tube can be in a range of about 6 pound-force per inch to about 12 pound-force per inch, as a non-limiting example. More particularly, the axial force applied on the tube can be approximately 9 pound-force per inch. The method can include achieving an interference fit between the hole of the panel and the tube followed by achieving the interference fit between the tube and the shoulder in the panel. As an example, the difference between the outer diameter of the tube and the diameter of the hole, that defines an interference, can be in a range of about 0.02 inch to about 0.04 inch. Particularly, the difference between the diameters can be in a range of about 0.004 inch to about 0.01 inch. More particularly, the difference between the diameters can be approximately 0.006 inch.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIG. 3C is a cross-section view of an assembly formed between the panel and tube of FIG. 2B;

FIG. 4A is a perspective view of a portion of another panel defining a hole;

FIG. 4B is a cross-section view of a portion of the panel of FIG. 4A defining the hole;

DETAILED DESCRIPTION

Figure 1:
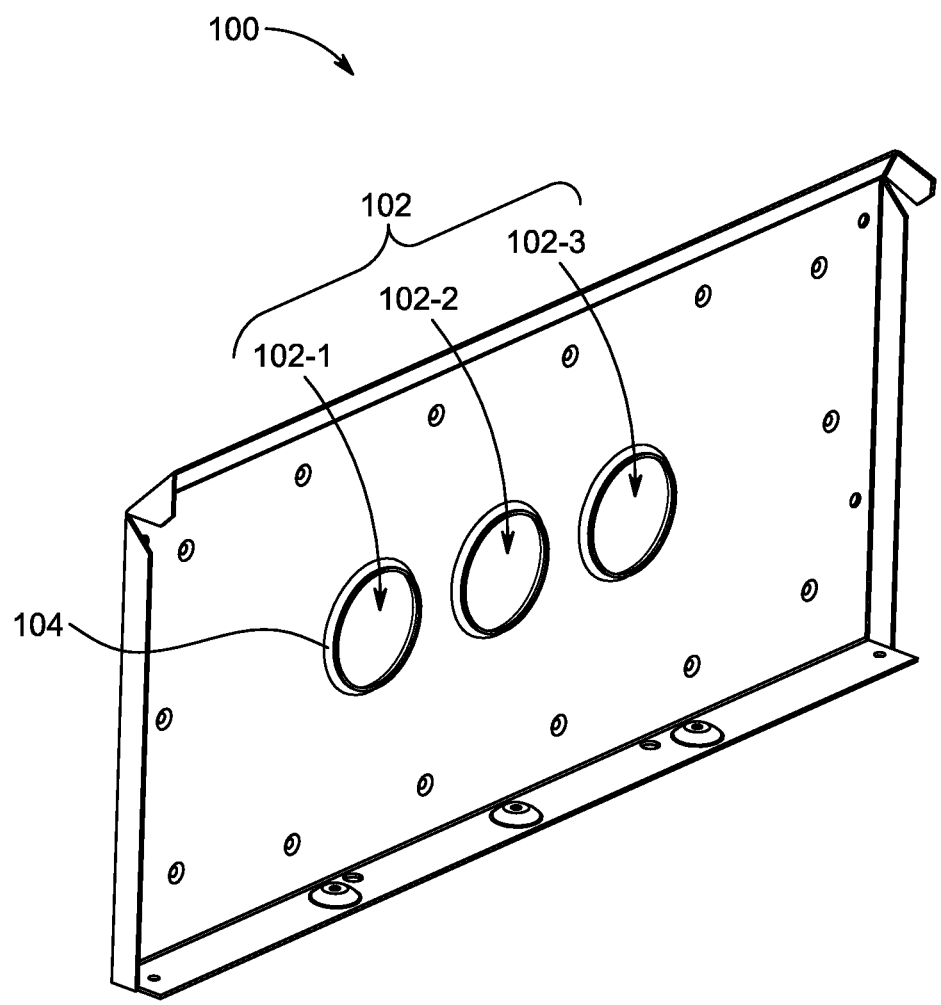
FIG. 1 is a perspective view of a panel.

Referring to FIG. 1, a perspective view of a panel 100 is illustrated. The panel 100 can be used in a heat exchanger (not shown). The panel 100 can define one or more holes 102-1, 102-2, 102-3, hereinafter collectively and commonly referred to as 'the hole 102'. The hole 102 can be formed in the panel 100 by a punching tool (not shown). When the hole 102 is punched in the panel 100, material of the panel 100, in a region subjected to punching, extends in a direction of application of force to form a shoulder 104 (also shown in FIGS. 3A, 3B, and 3C, for example). For the purpose of clarity in figures, the shoulder 104 is shown extending uniformly and substantially perpendicular to a surface of the panel 100, but can otherwise be irregular and non-uniform. Also, it is anticipated that other modes of defining the hole 102 in the panel 100 can also be implemented.

Figure 2A:
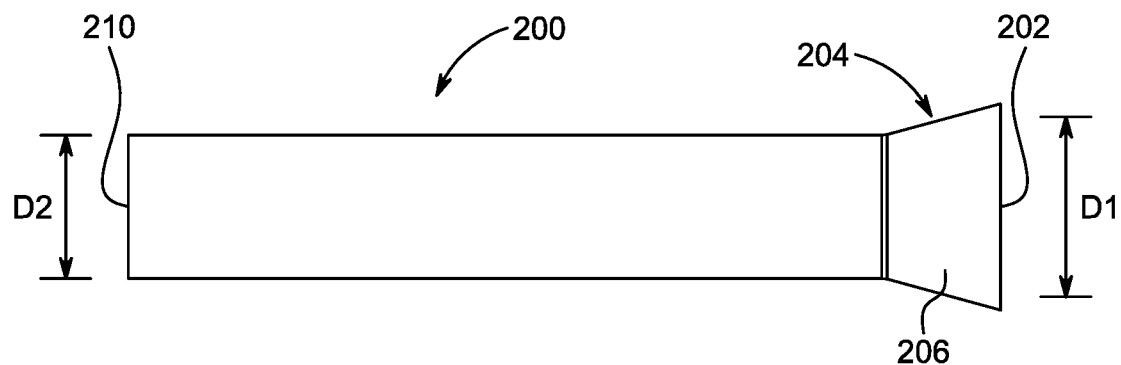
FIG. 2A is a planar view of a tube with a preformed portion at one end thereof.
Figure 2B:
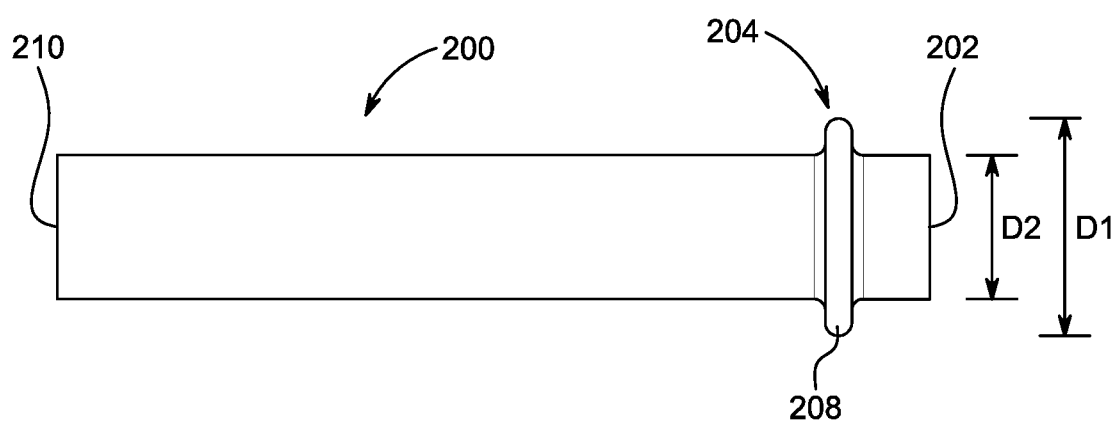
FIG. 2B is a planar view of the tube with another preformed portion at one end thereof.

FIG. 2A and FIG. 2B illustrate planar views of a tube 200. As an example, the tube 200 can have a wall thickness of approximately 0.020 inch and can made of stainless steel (e.g., stainless steel of grade 309 or grade 416). Alternatively, the tube 200 can be made of copper, aluminum, copper-nickel, Hastelloy, Inconel, titanium, or some other metal. Optionally, a first end 202 of the tube 200 can be preformed, for example by a tube beading process, until a diameter 'D1' of a preformed portion 204 of the tube 200 is greater than an outer diameter 'D2' of the tube 200 and/or until the diameter D1 of the preformed portion 204 is a desired diameter (e.g., a desired diameter that is larger than the outer diameter D2 of the tube 200). The first end 202 of the tube 200 can be preformed to generate a flare 206 or a flange 208 (shown in FIG. 2B). The first end 202 of the tube 200 can be roll formed or stamped with a die to generate the flare 206 or the flange 208.

Figure 3A:
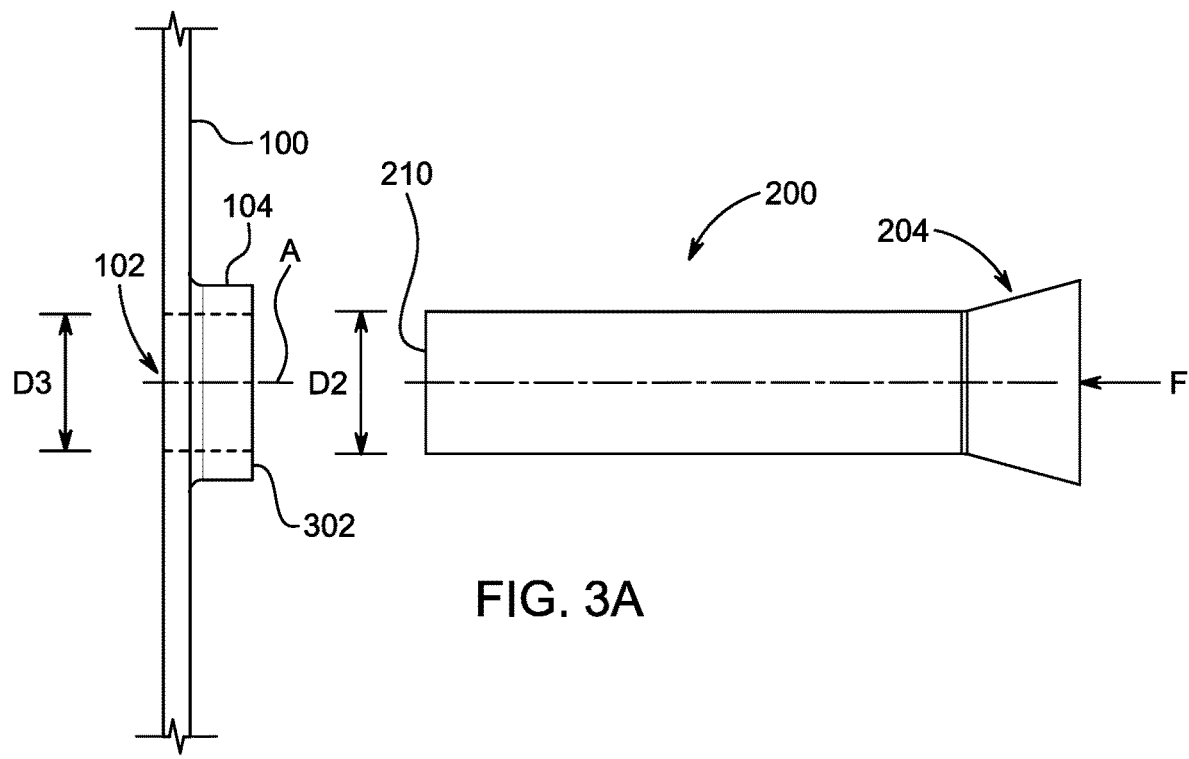
FIG. 3A shows the tube aligned with a hole defined in the panel.
Figure 3B:
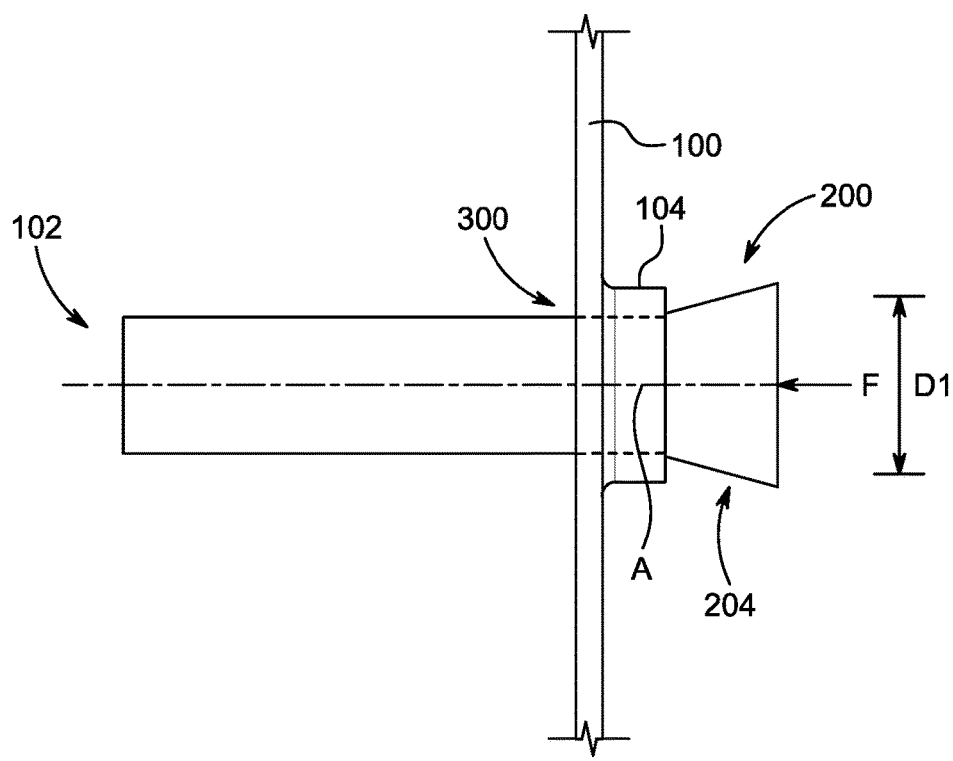
FIG. 3B shows an assembly formed between the panel and tube of FIG. 2A.

Referring to FIG. 3A, the preformed tube 200 can be aligned with respect to an axis 'A' of the hole 102 of the panel 100 with a second end 210 of the tube 200 facing the panel 100. That is, the end 210 of the tube 200 opposite the preformed portion 204 can be inserted into the hole 102 from the side of the hole 102 having the shoulder 104 extending outwardly from the panel 100. The outer diameter 'D2' of the tube 200 can be greater than a diameter 'D3' of the hole 102. As an illustrative example, the outer diameter 'D2' of the tube 200 can be 0.25 inch and the diameter 'D3' of the hole 102 can be 0.244 inch. When the tube 200 is subjected to an axial force 'F', the first end 202 of the tube 200 can be forced to deform and can be subsequently inserted through the hole 102, as shown in FIG. 3B. As an illustrative example, the axial force 'F' can be in a range of about 6 pound-force per inch to about 12 pound-force per inch. As a more specific example, the axial force 'F' can be 9 pound-force per inch. Owing to an overlap in the outer diameter 'D2' of the tube 200 and the diameter 'D3' of the hole 102, an interference fit can be achieved between a periphery of the hole 102 and the outer diameter 'D2' of the tube 200. The interference fit can function as a rigid joint and can form an assembly 300 between the panel 100 and the tube 200. It will be understood that a strength of the joint formed as a result of the interference fit can be proportional to the difference between the outer diameter 'D2' of the tube 200 and the diameter 'D3' of the hole 102. As an illustrative example, the difference between the outer diameter 'D2' of the tube 200 and the diameter 'D3' of the hole 102 can be in a range of about 0.02 inch to about 0.04 inch. As another example, the difference between the outer diameter 'D2' of the tube 200 and the diameter 'D3' of the hole 102 can be in a range of about 0.004 inch to about 0.01 inch. As a more specific example, the difference between the outer diameter 'D2' of the tube 200 and the diameter 'D3' of the hole 102 can be 0.006 inch.

Additionally, the interference fit between the shoulder 104 and the outer diameter 'D2' of the tube 200 can add to the rigidity of the joint. Although FIG. 3A and FIG. 3B show the tube 200 being inserted from one side of the panel 100 at which the shoulder 104 extends, it should be understood that the tube 200 can alternatively be inserted through the hole 102 from an opposite side of the panel 100.

The axial force 'F' can be applied until the preformed portion 204, such as the flare 206, abuts the shoulder 104 of the panel 100 (as shown in FIG. 3B). The diameter 'D1' of the preformed portion 204 can be greater than the diameter 'D3' of the hole 102 and the shoulder 104. Therefore, the preformed portion 204 conceals the hole 102 in the panel 100 besides sealing a lip 302 of the shoulder 104. Alternatively or additionally, the axial force 'F' can be applied until the flange 208 abuts the shoulder 104 of the panel 100, as shown in FIG. 3C, and seal the lip 302 of the shoulder 104. Advantageously, the flange 208 can functions as a stopper to cease further insertion of the tube 200 into the hole 102 of the panel 100.

The tube 200 including the preformed portion 204 can be subjected to a heat treatment process extending up to, for example, two hours through multiple heat treatment cycles. Each heat treatment cycle can include heating the tube 200 in a furnace. As an example, the tube 200 can be heated at 750° F. for about ten minutes followed by cooling the tube 200 (e.g., under a fan) for about 2.5 minutes. The thickness of the panel 100 can be increased based on the axial force 'F' applied on the tube 200. Optionally, multiple panels can be stacked together to define a panel assembly (not shown) capable of withstanding the axial force 'F' applied on the tube 200. In either or both such embodiments, soldering or brazing operation can be performed to secure the joint.

FIG. 4A illustrates a perspective view of a portion of a panel 400 and FIG. 4B shows a cross-section view of a portion of the panel 400 and the hole 402 defined in the panel 400, according to another embodiment of the present disclosure. Structurally, the panel 400 can be similar to the panel 100 described with respect to FIG. 1. The panel 400 can define a hole 402, having a diameter 'D4' and an axis 'B', and a shoulder 404 that extends from a periphery of the hole 402. Optionally, the hole 402 can be formed using a nail, rod, punch, or the like (not shown). As such, the diameter 'D4' of the hole 402 can be smaller than the diameter 'D3' of the hole 102 shown in FIG. 3A.

Figure 5A:
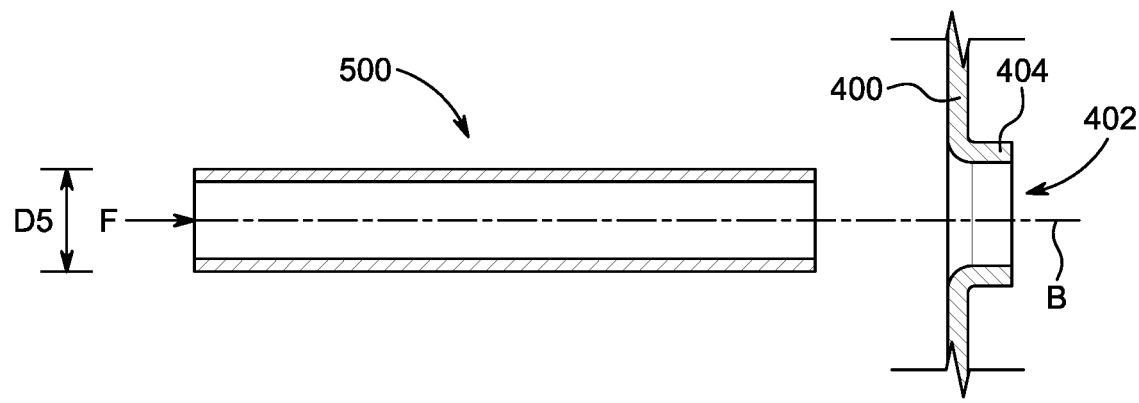
FIG. 5A is a cross-section view of a thin tube aligned with the hole defined in the panel of FIG. 4A.
Figure 5B:
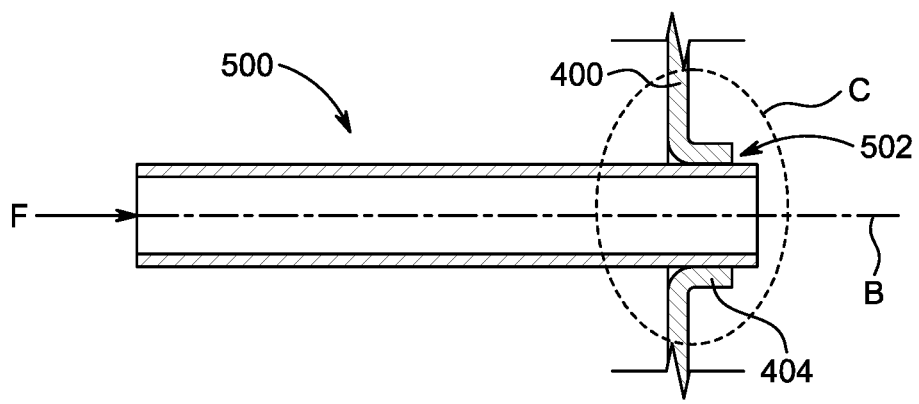
FIG. 5B is a cross-section of an assembly formed between the thin tube and the panel of FIG. 4A.

Referring to FIG. 5A, a cross-section of a tube 500 is shown aligned with the hole 402 with respect to the axis 'B'. The tube 500 can have an outer diameter 'D5' and the hole 402 can be undersized in relation to the outside diameter 'D5' of the tube 500. Upon application of the axial force 'F', one end of the tube 500 can be pressed against the periphery of the hole 402, thereby causing the end of the tube 500 to deform owing to friction between the periphery of the hole 402 and the tube 500. The deformation of the one end of the tube 500 can aid insertion of the tube 500 through the hole 402 of the panel 400, as shown in FIG. 5B. Due to the overlap in the outer diameter 'D5' of the tube 500 and diameter 'D4' of the hole 402, an interference fit can be achieved between the tube 500 and the hole 402 of the panel 400. The interference fit can function as a rigid joint and can define an assembly 502 between the panel 400 and the tube 500.

Figure 5C:
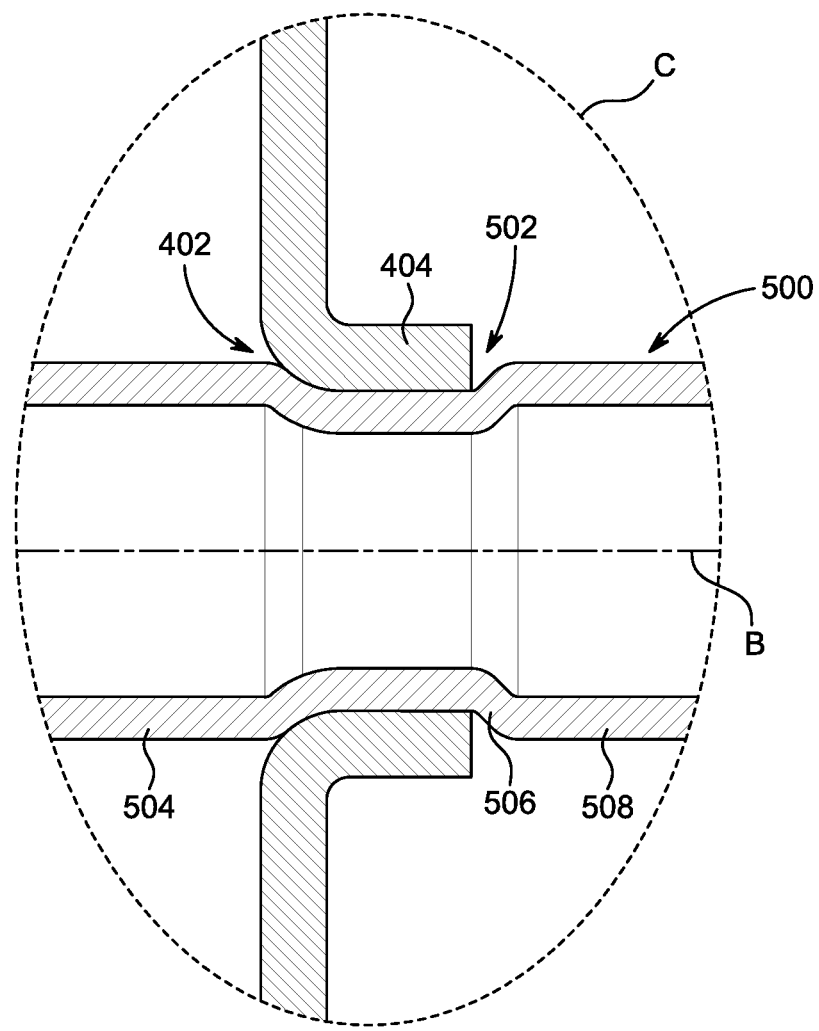
FIG. 5C is an enlarged view of a portion 'C' in FIG. 5B.

Referring to FIG. 5C, an enlarged portion 'C' of FIG. 5B is shown. As the tube 500 is inserted through the hole 402 under the influence of the axial force 'F', a first section 504 of the tube 500 can deform to form a second section 506 that is inserted into the hole 402. The interference fit can be achieved between the second section 506 of the tube 500 and the periphery of the hole 402. With further axial force 'F', the tube 500 can move further through the hole 402, causing a third section 508 to emerge out of the hole 402. Since the tube 500 is not subjected to any circumferential constraints after emerging from the hole 402, the tube 500 can tend to expand radially, by virtue of characteristics of material of the tube 500, as shown in the FIG. 5C. It should be understood that the radial expansion illustrated in the third section 508 of the tube 500 is an exaggeration for clarity of description and can be practically negligibly small.

Figure 6:
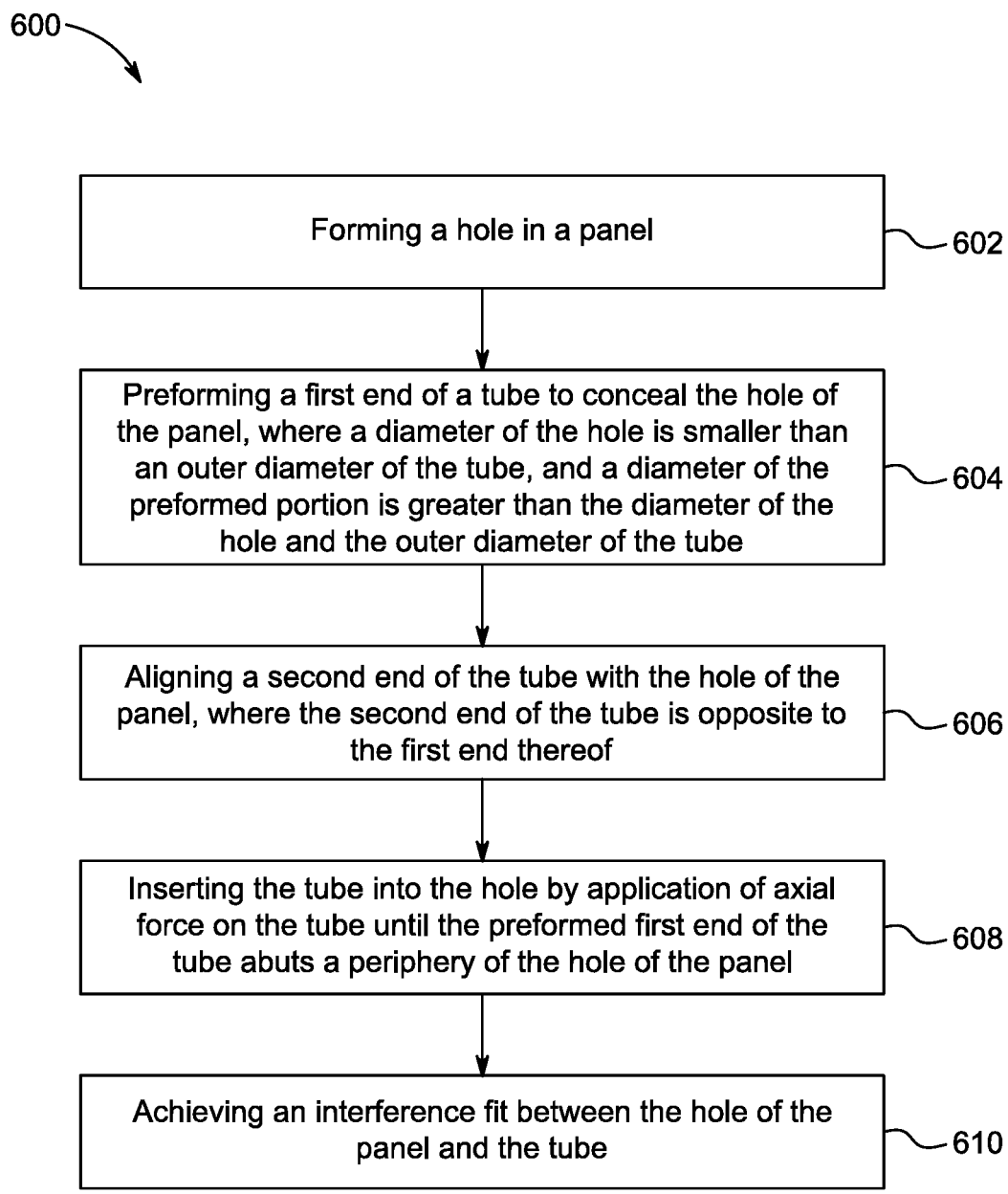
FIG. 6 is a flowchart of a method of forming the assembly.

FIG. 6 illustrates a flowchart of a method 600 of forming the assembly 300 between the panel 100 and the tube 200. The method 600 is described in conjunction with the FIG. 1 through FIG. 3C. At step 602, the method 600 can include forming the hole 102 in the panel 100. The method 600 at step 602 can include punching the hole 102 in the panel 100 by a punching tool (not shown) and forming the shoulder 104 extending from the periphery of the hole 102.

At step 604, the method 600 can include preforming the first end 202 of the tube 200 to conceal the hole 102 of the panel 100. The diameter 'D3' of the hole 102 of the panel 100 can be less than the outer diameter 'D2' of the tube 200, and the diameter 'D1' of the preformed portion 204 can be greater than the diameter 'D3' of the hole 102 and the outer diameter 'D2' of the tube 200. As an example, the outer diameter 'D2' of the tube 200 can be approximately 0.25 inch and the diameter 'D3' of the hole 102 can be approximately 0.244 inch. Although not explicitly stated in FIG. 6, the method 600 at step 604 can include preforming the first end 202 of the tube 200 to generate the flare 206 or the flange 208. As an example, the tube 200 can be made of stainless steel.

At step 606, the method 600 can include aligning the second end 210 of the tube 200 with the hole 102 of the panel 100, particularly with reference to the axis 'A' of the hole 102.

At step 608, the method 600 can include inserting the tube 200 into the hole 102 by application of the axial force 'F' on the tube 200 until the preformed first end 202 of the tube 200—that is, the performed portion 204 of the tube 200—abuts the periphery of the hole 102 of the panel 100. The axial force 'F' can be in a range of about 6 pound-force per inch to about 12 pound-force per inch. As a more specific example, the axial force 'F' can be approximately 9 pound-force per inch. The method 600 at step 608 can include sealing the lip 302 of the shoulder 104 with the flare 206 or the flange 208 preformed at the first end 202 of the tube 200.

At step 610, the method 600 can include achieving the interference fit between the hole 102 of the panel 100 and the tube 200 followed by achieving the interference fit between the tube 200 and the shoulder 104. The overlap between the outer diameter 'D2' of the tube 200 and the diameter 'D3' of the hole 102 can cause the interference fit, thereby forming the joint between the tube 200 and the panel 100 and hence defining the assembly 300. As such, strength of the joint can be proportional to the difference (for the brevity in the description, hereinafter referred to as 'the value') between the outer diameter 'D2' of the tube 200 and the diameter 'D3' of the hole 102. As an example, the value can be in a range of about 0.02 inch to about 0.04 inch. As another example, the value can be in a range of about 0.004 inch to about 0.01 inch. As a more specific example, the value can be 0.006 inch.

INDUSTRIAL APPLICABILITY

The present disclosure provides the method 600 of forming the assembly 300 between the panel 100 and the tube 200. In an implementation, the assembly 300 can be used in, but not limited to, construction of the heat exchanger (not shown). The method 600 can provide a cost-effective manner of forming the assembly 300. Since the tube 200 can be preformed prior to inserting into the hole 102 of the panel 100, use of a mandrel can be eliminated. As such, high volumes of production of the assembly 300 can be conveniently and efficiently processed without requirement of any additional setup to handle the mandrel. Additionally, development of heat in the walls of the tube 200 can be reduced, thereby minimizing stress in the tube 200, which would otherwise be high with the use of a mandrel to form the interference fit. Further, experimentally, it was found that strength of the joint formed between the tube 200 and the panel 100 was not negatively affected by the heat treatment process carried out on the tube 200.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A method of forming an assembly between a panel and a stainless steel tube, the method comprising:
    forming a hole in the panel, wherein a diameter of the hole is smaller than an outer diameter of the tube;
    preforming a first end of the tube to create a preformed portion of the tube, wherein a diameter of the preformed portion is greater than the diameter of the hole and the outer diameter of the tube and a difference between the outer diameter of the tube and the diameter of the hole is from 0.004 inch to 0.01 inch;
    aligning a second end of the tube with the hole of the panel, the second end of the tube being opposite to the first end thereof; and
    creating an interference fit between the hole of the panel and the tube, without the use of a mandrel, by inserting the tube into the hole by application of an axial force from 6 pound-force per inch to 12 pound-force per inch on the tube until the preformed portion of the tube abuts a periphery of the hole of the panel,
    wherein the interference fit forms a rigid joint and seal between the tube and the panel.

2. The method of claim 1, wherein the diameter of the hole is 0.244 inch.

3. The method of claim 1, wherein the outer diameter of the tube is 0.25 inch.

4. The method of claim 1, wherein the difference between the outer diameter of the tube and the diameter of the hole is 0.006 inch.

5. The method of claim 1, wherein the axial force is 9 pound-force per inch.

6. The method of claim 1, wherein a lip of a shoulder formed in the panel is sealed with a flare or a flange preformed at the first end of the tube.

* * * * *